(12) United States Patent
Liu et al.

(10) Patent No.: US 8,289,168 B2
(45) Date of Patent: Oct. 16, 2012

(54) RFID ANTI-THEFT TAG STRUCTURE

(76) Inventors: Tai-Hua Liu, Hsinchu (TW); Yi-Chun Sung, Hsinchu (TW)

( * ) Notice: Subject to any disclaimer, the term of this patent is extended or adjusted under 35 U.S.C. 154(b) by 448 days.

(21) Appl. No.: 12/641,325

(22) Filed: Dec. 18, 2009

(65) Prior Publication Data

US 2011/0148637 A1 Jun. 23, 2011

(51) Int. Cl.
*G08B 13/14* (2006.01)

(52) U.S. Cl. ............... 340/572.8; 340/572.3; 340/572.4

(58) Field of Classification Search .............. 340/572.8, 340/568.1, 572.3, 572.4, 572.6, 572.7
See application file for complete search history.

(56) References Cited

U.S. PATENT DOCUMENTS

| | | | |
|---|---|---|---|
| 6,154,137 A * | 11/2000 | Goff et al. | 340/572.4 |
| 6,646,554 B1 * | 11/2003 | Goff et al. | 340/572.6 |
| 7,109,867 B2 * | 9/2006 | Forster | 340/572.3 |
| 8,072,332 B2 * | 12/2011 | Forster | 340/572.3 |
| 2007/0231614 A1 * | 10/2007 | Kondo et al. | 340/572.8 |

* cited by examiner

*Primary Examiner* — John A Tweel, Jr.
(74) *Attorney, Agent, or Firm* — Lin & Associates IP, Inc.

(57) ABSTRACT

An RFID anti-theft tag structure is disclosed. The RFID anti-theft tag structure includes a first protective layer, a paper sheltering layer, a permanent-magnetic alloy film, an RFIC, a sticky film, at least one alloy sheet, and a second protective layer sequentially disposed one on another from bottom to upper side. The alloy sheet can be repetitively magnetized and demagnetized. The permanent-magnetic alloy film and the alloy sheet are thus combined for cooperatively achieving the anti-theft function. The permanent-magnetic alloy film is divided into two independent portions, which are electrically coupled to the RFIC for serving as an antenna of the RFIC so as to achieve the RFID function. In such a way, the RFID anti-theft tag structure of the present invention integrally attains the anti-theft tag function and the RFID function, saves production cost and improves the convenience of use.

8 Claims, 2 Drawing Sheets

RFID ANTI-THEFT TAG STRUCTURE

BACKGROUND OF THE INVENTION

1. Field of the Invention

The present invention relates generally to an anti-theft tag structure, and more particularly, to an RFID anti-theft tag structure.

2. The Prior Arts

In accordance with the development of the semiconductor industry, radio frequency identification chips (RFIC) which are small and have strong capabilities have been widely employed in radio frequency identification (RFID) field, such as entry control, ID card, supply chain management, electronic toll collection (ETC), and real-time locating system (RTLS).

Furthermore, in order to set up an effective anti-theft mechanism for avoiding commodities from being illegally taken away, RFID tags are usually attached to commodities in facilitation with the detection devices equipped at the exits of stores. When any commodity carrying such an RFID tag is illegally brought passing by the detection devices, the RFID tag will emit a signal, and the signal can be detected by the detection devices, and correspondingly an alarm lamp/bell will be enabled. In such a way, the commodity can be protected from being illegally taken away.

Referring to FIG. 1, there is shown a conventional anti-theft tag structure. As shown in FIG. 1, the conventional anti-theft tag structure includes a first protective layer 10, a paper sheltering layer 20, a permanent-magnetic alloy film 30, a sticky film 40, at least one alloy sheet 50, and a second protective layer 60 sequentially disposed one on another from bottom to upper side. The alloy sheet 50 can be repetitively magnetized and demagnetized. The sticky film 40 is employed for separating the permanent-magnetic alloy film 30 from the alloy sheet 50, and supporting the alloy sheet 50. The paper sheltering layer 20 is adapted for providing a sheltering function. The first protective layer 10 and the second protective layer 60 are provided for covering the paper sheltering layer 20, the permanent-magnetic alloy film 30, the sticky film 40, and the alloy sheet 50, and providing a protection thereto.

The permanent-magnetic alloy film 30 is adapted for emitting a signal, and an external detection device (not shown in the drawing) is provided for detecting the signal emitted from the permanent-magnetic alloy film 30. However, when the alloy sheet 50 is magnetized, the alloy sheet 50 is magnetic and is thus adapted to disturb the signal emitted from the permanent-magnetic alloy film 30, so that the signal cannot be detected by the detection device. When the alloy sheet 50 is demagnetized, the alloy sheet 50 is nonmagnetic, and therefore the signal emitted from the permanent-magnetic alloy film 30 can be detected by the detection device so that the alarm is enabled to cause an alert.

Accordingly, an anti-theft tag containing such a nonmagnetic alloy sheet can be attached to a commodity. In case such a commodity is illegally taken away via the detection device, the alarm will be enabled to generate an alert. When the commodity is purchased by a customer, the cashier can magnetize the alloy sheet contained in the anti-theft tag, so that the commodity can be taken away via the detection device without enabling the alarm.

However, although the conventional anti-theft tag structure includes an RFID function and an anti-theft tag function, these two functions are independently realized. Such a conventional anti-theft tag structure requires not only a higher cost, but also a relatively complicated assembly process, which may decrease the reliability and yield of the products. As such, an anti-theft tag structure integrally combining the RFID function and the anti-theft tag function for solving the problem of the conventional anti-theft tag is highly desired.

SUMMARY OF THE INVENTION

A primary objective of the present invention is to provide an RFID anti-theft tag structure. The RFID anti-theft tag structure includes a first protective layer, a paper sheltering layer, a permanent-magnetic alloy film, an RFIC, a sticky film, at least one alloy sheet, and a second protective layer sequentially disposed one on another from bottom to upper side. The alloy sheet can be repetitively magnetized and demagnetized.

When the alloy sheet is demagnetized, it is nonmagnetic or achieves a reduced magnetic characteristic. When the alloy sheet is magnetized, the alloy sheet is magnetic or presents an enhanced magnetic characteristic relative to the reduced magnetic characteristic. The magnetized alloy sheet disturbs the permanent-magnetic alloy film so that the signal emitted from the permanent-magnetic alloy film cannot be effectively detected by an external detection device. The permanent-magnetic alloy film and the alloy sheet are thus combined for cooperatively achieving the anti-theft function. The permanent-magnetic alloy film is divided into two independent portions, which are electrically coupled to the RFIC for serving as an antenna of the RFIC so as to achieve the RFID function. In such a way, the RFID anti-theft tag structure of the present invention integrally attains the anti-theft tag function and the RFID function, saves production cost and improves the convenience of use.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
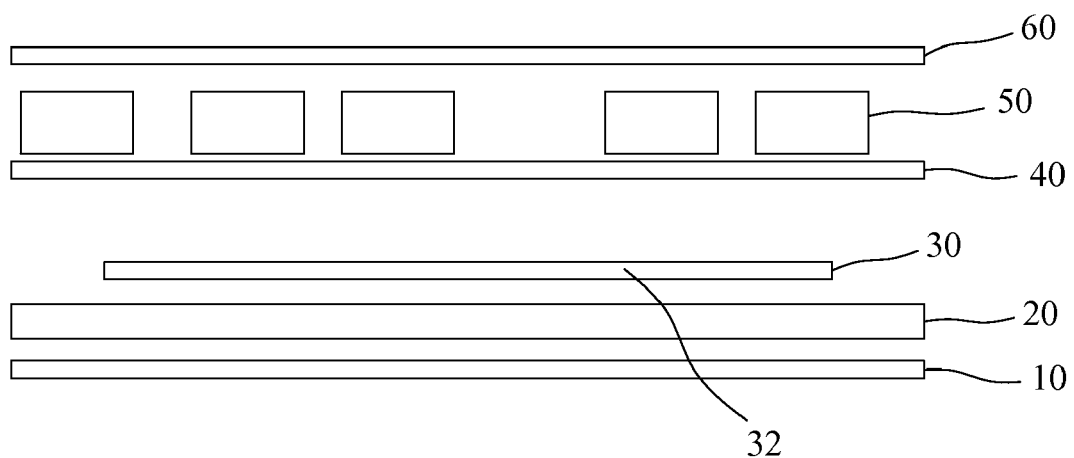
FIG. 1 is a schematic diagram illustrating a conventional anti-theft tag structure.

The accompanying drawings are included to provide a further understanding of the invention, and are incorporated in and constitute a part of this specification. The drawing illustrates embodiments of the invention and, together with the description, serves to explain the principles of the invention.

Figure 2:
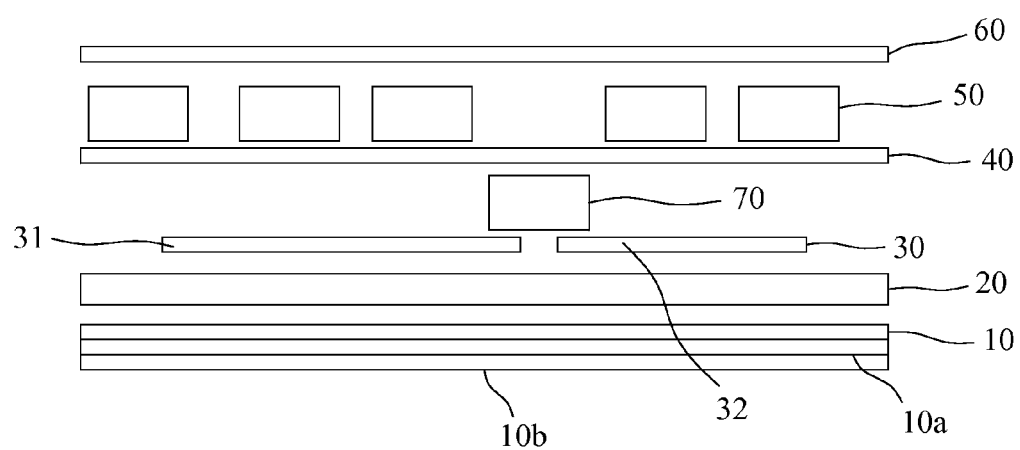
FIG. 2 is a schematic diagram illustrating an RFID anti-theft tag structure according to an embodiment of the present invention.

FIG. 2 is a schematic diagram illustrating an RFID anti-theft tag structure according to an embodiment of the present invention. The RFID anti-theft tag structure includes a first protective layer 10, a sheltering layer 20, a permanent-magnetic alloy film 30, a radio frequency identification chip (RFIC) 70, a sticky film 40, at least one alloy sheet 50, and a second protective layer 60 sequentially disposed one on another from bottom to upper side. The first protective layer 10 and the second protective layer 60 cover the sheltering layer 20, the permanent-magnetic alloy film 30, the RFIC 70, the sticky film 40, and the alloy sheet 50 for providing a protection to all of them. The sheltering layer 20 is preferably a paper made sheltering layer adapted for providing a sheltering function. The alloy sheet 50 can be repetitively magnetized and demagnetized. When the alloy sheet 50 is demagnetized, it is nonmagnetic or achieves a reduced magnetic characteristic. When the alloy sheet 50 is magnetized, the alloy sheet 50 is magnetic or presents an enhanced magnetic characteristic relative to the reduced magnetic characteristic. The magnetized alloy sheet 50 disturbs the permanent-magnetic alloy film 30, so that the signal emitted from the permanent-magnetic alloy film 30 cannot be effectively detected by an external detection device (not shown in the drawings). The permanent-magnetic alloy film 30 and the alloy sheet 50 are thus combined for cooperatively achieving the anti-theft function.

As shown in FIG. 2, the permanent-magnetic alloy film 30 includes two independent portions, i.e., a first portion 31 and a second portion 32. The first portion 31 and the second portion 32 are electrically coupled to the RFIC 70. The first portion 31 serves as one end of an antenna of the RFIC 70, and the second portion 32 serves as another end of the antenna of the RFIC 70. In such a way, the first portion 31 and the second portion 32 function as an antenna of the RFIC 70 to transmit and receive RF signals.

According to an embodiment of the present invention, the RFID anti-theft tag structure further includes a bonding layer 10a. The bonding layer 10a is positioned beneath the first protective layer 10 for attaching the RFID anti-theft tag to a commodity. According to another embodiment of the present invention, the RFID anti-theft tag structure further includes a peel-off layer 10b. The peel-off layer 10b is configured in conjunction with the bonding layer 10a. The peel-off layer 10b is provided for preventing the bonding layer 10a from being bonded with other objects, and only when the RFID anti-theft tag structure is to be used, the peel-off layer 10b is peeled off from the bonding layer 10a to expose the bonding layer 10a.

The first protective layer 10 and the second protective layer 60 are preferably made of plastic material. The sheltering layer 20 is preferably made of paper. The alloy sheet 50 is either a cobalt-based magnetic alloy material or an iron-based magnetic alloy material. The peel-off 10b layer for example can be a polyethylene terephthalate (PET) film.

In such a way, the RFID anti-theft tag structure of the present invention integrally attains the anti-theft tag function and the RFID function, saves production cost and improves the convenience of use.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An RFID anti-theft tag structure, comprising:
a first protective layer;
a sheltering layer, providing a sheltering function;
a permanent-magnetic alloy film, for generating a signal, wherein the permanent-magnetic alloy film is divided into a first portion and a second portion;
a radio frequency identification chip (RFIC), having a radio frequency identification (RFID) function and being electrically connected to the first portion and the second portion of the permanent-magnetic alloy film, respectively;
a sticky film;
at least one alloy sheet, adapted for being repetitively magnetized and demagnetized; and
a second protective layer,
wherein the first protective layer, the sheltering layer, the permanent-magnetic alloy film, the RFIC, the sticky film, the alloy sheet, and the second protective layer are sequentially disposed one on another from bottom to upper side,
wherein the first protective layer and the second protective layer cover the sheltering layer, the permanent-magnetic alloy film, the RFIC, the sticky film, and the alloy sheet, for protecting a protection thereto, and the alloy sheet and the permanent-magnetic alloy film work in conjunction to provide an anti-theft function.

2. The RFID anti-theft tag structure according to claim 1, wherein the first protective layer and the second protective layer are made of plastic material.

3. The RFID anti-theft tag structure according to claim 1, wherein the sheltering layer is made of paper.

4. The RFID anti-theft tag structure according to claim 1, wherein the first portion and the second portion of the permanent-magnetic alloy film serve as an antenna of the RFIC.

5. The RFID anti-theft tag structure according to claim 1, wherein the alloy sheet is made of either a cobalt-based magnetic alloy material or an iron-based magnetic alloy material.

6. The RFID anti-theft tag structure according to claim 1, further comprising a bonding layer provided beneath the first protective layer for attaching the RFID anti-theft tag structure onto a commodity.

7. The RFID anti-theft tag structure according to claim 6, further comprising a peel-off layer configured in conjunction with the bonding layer, wherein the peel-off layer is provided for preventing the bonding layer from being bonded with other objects, and only when the RFID anti-theft tag structure is to be used, the peel-off layer is peeled off from the bonding layer to expose the bonding layer.

8. The RFID anti-theft tag structure according to claim 7, wherein the peel-off layer is a polyethylene terephthalate (PET) film.

* * * * *